US008170195B2

(12) United States Patent
Conway et al.

(10) Patent No.: US 8,170,195 B2
(45) Date of Patent: May 1, 2012

(54) METHODS AND SYSTEMS FOR VERIFYING TYPED OBJECTS OR SEGMENTS OF A TELEPHONIC COMMUNICATION BETWEEN A CUSTOMER AND A CONTACT CENTER

(75) Inventors: Kelly Conway, Lake Bluff, IL (US);
Douglas Brown, Austin, TX (US);
Adrian Horton, Charlton, NY (US);
David Gustafson, Lake Forest, IL (US);
Christopher Danson, Austin, TX (US)

(73) Assignee: Mattersight Corporation, Lake Forest, IL (US)

( * ) Notice: Subject to any disclaimer, the term of this patent is extended or adjusted under 35 U.S.C. 154(b) by 884 days.

(21) Appl. No.: 12/286,248

(22) Filed: Sep. 29, 2008

(65) Prior Publication Data
US 2009/0103698 A1 Apr. 23, 2009

Related U.S. Application Data

(60) Provisional application No. 60/976,363, filed on Sep. 28, 2007.

(51) Int. Cl.
*H04M 3/00* (2006.01)
*H04M 5/00* (2006.01)

(52) U.S. Cl. .......... 379/265.01; 379/201.01; 379/167.12
(58) Field of Classification Search ............ 379/265.01, 379/201.01, 167.12
See application file for complete search history.

(56) References Cited

U.S. PATENT DOCUMENTS 7,224,788 B1 * 5/2007 Rhee et al. ............... 379/207.02
2001/0033644 A1 * 10/2001 Offer ....................... 379/221.08

* cited by examiner

*Primary Examiner* — Quynh Nguyen
(74) *Attorney, Agent, or Firm* — McDermott Will & Emery LLP

(57) ABSTRACT

A computer readable medium for controlling a computer is provided. The computer readable medium comprises a plurality of code segments for controlling a computer. A code segment receives a telephonic communication comprised of voice data and event data. A code segment receives computer application data comprising data associated with at least one computer application in use during the telephonic communication. A code segment analyzes the telephonic communication by translating the received voice data into a text format, the text format defining a plurality of components. At least one component of the text data and communication event data occurring during a time interval is classified into one of a plurality of object types, and the computer application data during the time interval is compared to the object type of the classified components.

15 Claims, 10 Drawing Sheets

METHODS AND SYSTEMS FOR VERIFYING TYPED OBJECTS OR SEGMENTS OF A TELEPHONIC COMMUNICATION BETWEEN A CUSTOMER AND A CONTACT CENTER

CROSS-REFERENCE TO RELATED APPLICATIONS

The present invention claims priority to U.S. Provisional Patent Application No. 60/976,363, filed Sep. 28, 2007.

TECHNICAL FIELD

The invention relates to a method and system for analyzing an electronic communication, more particularly, to analyzing a telephone communication between a customer and a contact center to determine communication objects, and verifying the typing of the objects by analyzing the computer application in use by the contact center agent at the time of an identified communications object.

BACKGROUND

It is known to utilize telephone call centers to facilitate the receipt, response and routing of incoming telephone calls relating to customer service, retention, and sales. Generally, a customer is in contact with a customer service representative ("CSR") or call center agent who is responsible for answering the customer's inquiries and/or directing the customer to the appropriate individual, department, information source, or service as required to satisfy the customer's needs. It is also known to utilize a web based system to facilitate requests and inquiries related to customer service.

At the contact center, a customer is in contact with a customer service representative ("CSR") or CSR agent who is responsible for answering the customer's inquiries and directing the customer to the appropriate individual, department, information source, or service as required to satisfy the customer's needs. At the contact center, the customer may also enter into an automated self-service system such as, for example, an interactive voice response ("IVR") system. In an IVR system, the customer speaks to the IVR system directly and has the call processed accordingly. It is also well known to provide self-service systems such as an Internet web-based system to transmit inquiries and identify possible solutions.

It is also known to monitor calls between a customer and a call center agent. Accordingly, call centers typically employ individuals responsible for listening to the conversation between the customer and the agent. Many companies have in-house call centers to respond to customers complaints and inquiries. In many case, however, it has been found to be cost effective for a company to hire third party telephone call centers to handle such inquiries. As such, the call centers may be located thousands of miles away from the actual sought manufacturer or individual. This often results in use of inconsistent and subjective methods of monitoring, training and evaluating call center agents. These methods also may vary widely from call center to call center.

While monitoring such calls may occur in real time, it is often more efficient and useful to record the call for later review. Information gathered from the calls is typically used to monitor the performance of the call center agents to identify possible training needs. Based on the review and analysis of the conversation, a monitor can make suggestions or recommendations to improve the quality of the customer interaction.

Accordingly, there is a need in customer relationship management ("CRM") for tools useful for breaking down a communication between a customer and a CSR into objects components and segments that may be classified into categories for analysis. It is further desirable to verify the typing (i.e., classification) of these communication objects or segments based at least in part on the computer application in use by a CSR during a particular communication or segment.

The present invention is provided to solve the problems discussed above and other problems, and to provide advantages and aspects not provided by prior systems of this type. A full discussion of the features and advantages of the present invention is deferred to the following detailed description, which proceeds with reference to the accompanying drawings.

SUMMARY

According to the present invention, a computer program for verifying the classification of a telephonic communication received by a contact center is provided. The computer program is embodied on a computer readable storage medium adapted to control a computer. The computer program comprises a plurality of code segments for performing the task. In particular, a telephonic communication including voice data and event data is received.

Computer application data comprising data related to the computer applications in use by an agent during the telephonic communication is received. The telephonic communication is analyzed. The code segment for analyzing the telephonic communication includes instructions (e.g., a code segment) for receiving voice data translated into a text format. The code segment for analyzing the telephonic communication also includes instructions classifying components of the text data and communication event data occurring during a time interval of the telephonic communication into one of a plurality of object types and instructions for comparing the computer application data generated during the time interval to the component type of the classified component.

According to another aspect of the invention, the code segment for verifying the classification of a telephonic communication received by a contact center includes instructions for separating the telephonic communication into at least first constituent voice data and second constituent voice data prior to analyzing the telephonic communication.

According to still another aspect of the invention, the code segment for verifying the classification of a telephonic communication received by a contact center includes instructions for generating a graphical user interface for displaying classified components and the computer application data generated during the time interval. The graphical user interface further includes instructions for inputting a command to retrieve one or more of the classified components and the computer application data generated during the time interval. Instructions for retrieving, displaying and navigation through the classified components commanded for retrieval and the computer application data generated during the time interval are also included.

According to another aspect of the invention, the code segment for verifying the classification of a telephonic communication received by a contact center includes instructions for generating output data indicative of the correlation of the computer application data generated during the time interval to the component type of the classified component.

According to another aspect of the invention, the code segment for verifying the classification of a telephonic communication received by a contact center includes instructions for storing the generated output data indicative of the correlation of the computer application data generated during the time interval to the component type of the classified component.

According to another aspect of the invention, the code segment for verifying the classification of a telephonic communication received by a contact center includes instructions for classifying the telephonic communication occurring during a time interval into a plurality of predetermined call types. Instructions for comparing the computer application data generated during the time interval to the call type of the telephonic communication are also included. Instructions for generating and storing output data indicative of the correlation of the computer application data generated during the time interval to the call type of the classified telephonic communication.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
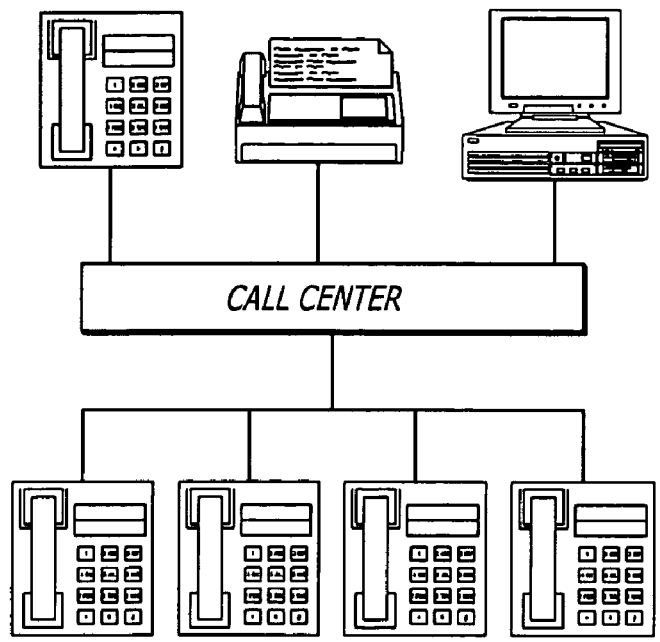
FIG. 1 is a block diagram of call center.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1-11, a method and system for analyzing an electronic communication between a customer and a contact center is provided. A "contact center" as used herein can include any facility or system server suitable for receiving and recording electronic communications from customers. Such communications can include, for example, telephone calls, facsimile transmissions, e-mails, web interactions, voice over IP ("VoIP") and video. It is contemplated that these communications may be transmitted by and through any type of telecommunication device and over any medium suitable for carrying data. For example, the communications may be transmitted by or through telephone lines, cable or wireless communications. As shown in FIG. 1, the contact center of the present invention is adapted to receive and record varying electronic communications and data formats that represent an interaction that may occur between a customer (or caller) and a contact center agent 9 during fulfillment of a customer and agent transaction.

Process descriptions or blocks in figures should be understood as representing modules, segments, or portions of code which include one or more executable instructions for implementing specific logical functions or steps in the process. Alternate implementations are included within the scope of the embodiments of the present invention in which functions may be executed out of order from that shown or discussed, including substantially concurrently or in reverse order, depending on the functionality involved, as would be understood by those having ordinary skill in the art.

Figure 2:
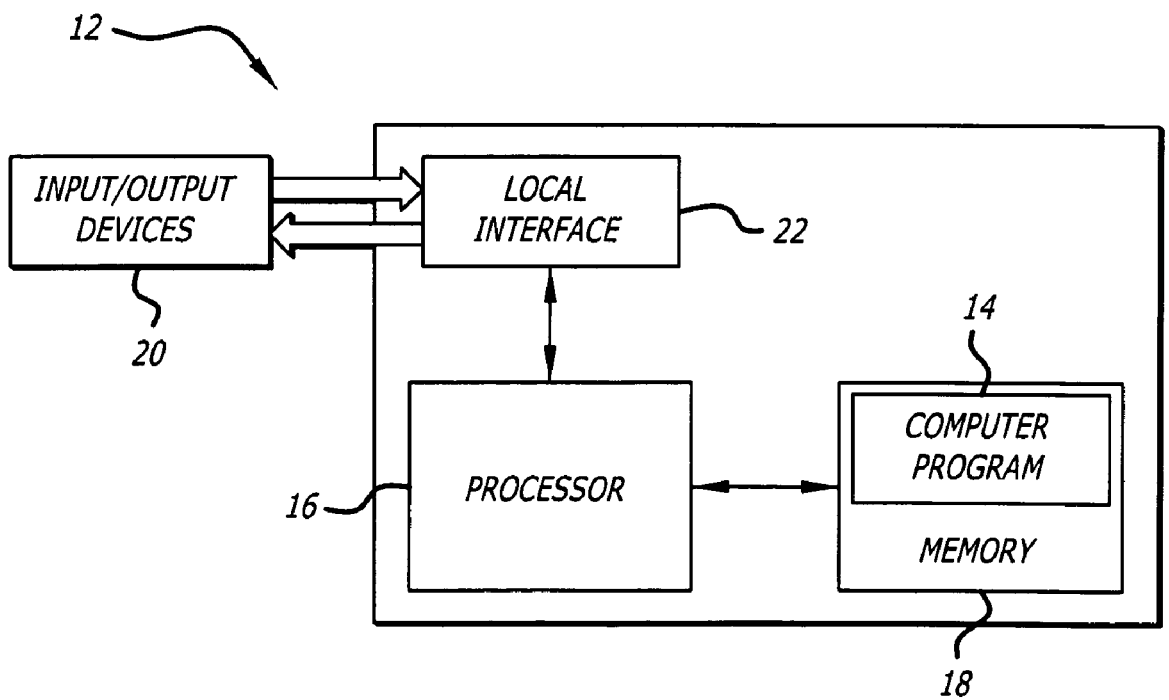
FIG. 2 is a block diagram of a computer used in connection with an exemplary embodiment of the present invention.

FIG. 2 is a block diagram of a computer or server 12. For purposes of understanding the hardware as described herein, the terms "computer" and "server" have identical meanings and are interchangeably used. Computer 12 includes control system 14. The control system 14 of the invention can be implemented in software (e.g., firmware), hardware, or a combination thereof. The control system 14 may be implemented in software, as an executable program, and is executed by one or more special or general purpose digital computer(s), such as a personal computer (PC; IBM-compatible, Apple-compatible, or otherwise), server computer, personal digital assistant, workstation, minicomputer, or mainframe computer. An example of a general purpose computer that can implement the control system 14 of the present invention is shown in FIG. 2. The control system 14 may reside in, or have portions residing in, any computer such as, but not limited to, a general purpose personal computer. Therefore, computer 12 of FIG. 2 may be representative of any computer in which the control system 14 resides or partially resides.

Generally, in terms of hardware architecture, as shown in FIG. 2, the computer 12 may include a processor 16, memory 18, and one or more input and/or output (I/O) devices 20 (or peripherals) that are communicatively coupled via a local interface 22. The local interface 22 may be, for example, but not limited to, one or more buses or other wired or wireless connections, as is known in the art. The local interface 22 may have additional elements, which are omitted for simplicity, such as controllers, buffers (caches), drivers, repeaters, and receivers, to enable communications. Further, the local interface may include address, control, and/or data connections to enable appropriate communications among the other computer components.

The processor 16 may be a hardware device for executing software, particularly software stored in memory 18. The processor 16 may be any custom made or commercially available processor, a central processing unit (CPU), an auxiliary processor among several processors associated with the computer 12, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x8 or Pentium series microprocessor from Intel Corporation, a PowerPC microprocessor from IBM, a Sparc microprocessor from Sun Microsystems, Inc., or a 68xxx series microprocessor from Motorola Corporation.

The memory 18 may include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 18 may incorporate electronic, magnetic, optical, and/or other types of storage media. The memory 18 may have a distributed architecture where various components are situated remote from one another, but can be accessed by the processor 16.

The software in memory 18 may include one or more separate programs, each of which comprises an ordered listing of executable instructions for implementing logical functions. In the example of FIG. 2, the software in the memory 18 includes the control system 14 in accordance with the present invention and a suitable operating system (O/S) 24. A non-exhaustive list of examples of suitable commercially available operating systems 24 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system 24 may control the execution of other computer programs, such as the control system 14, and provides scheduling, input-output control, file and data management, memory management, and communication control and related services.

The control system 14 may be a source program, executable program (object code), script, or any other entity comprising a set of instructions to be performed. When a source program, the program needs to be translated via a compiler, assembler, interpreter, or the like, which may or may not be included within the memory 18, so as to operate properly in connection with the O/S 24. Furthermore, the control system 14 may be written as (a) an object oriented programming language, which has classes of data and methods, or (b) a procedure programming language, which has routines, subroutines, and/or functions, for example but not limited to, C, C++, C# (C Sharp), Pascal, Basic, Fortran, Cobol, Perl, Java, and Ada. The I/O devices 20 may include input devices, for example but not limited to, a keyboard, mouse, scanner, microphone, touch screens, interfaces for various medical devices, bar code readers, stylus, laser readers, radio-frequency device readers, etc. Furthermore, the I/O devices 20 may also include output devices, for example but not limited to, a printer, bar code printers, displays, etc. Finally, the I/O devices 20 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 12 is a PC, sever, workstation, PDA, or the like, the software in the memory 18 may further include a basic input output system (BIOS) (not shown in FIG. 2). The BIOS is a set of software routines that initialize and test hardware at startup, start the O/S 24, and support the transfer of data among the hardware devices. The BIOS is stored in ROM so that the BIOS can be executed when the computer 12 is activated.

When the computer 12 is in operation, the processor 16 is configured to execute software stored within the memory 18, to communicate data to and from the memory 18, and to generally control operations of the computer 12 pursuant to the software. The control system 14 and the O/S 24, in whole or in part, but typically the latter, are read by the processor 16, perhaps buffered within the processor 16, and then executed.

When the control system 14 is implemented in software, as is shown in FIG. 2, it should be noted that the control system 14 can be stored on any computer readable medium for use by or in connection with any computer related system or method. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. The control system 14 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Where the control system 14 is implemented in hardware, the control system 14 may be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
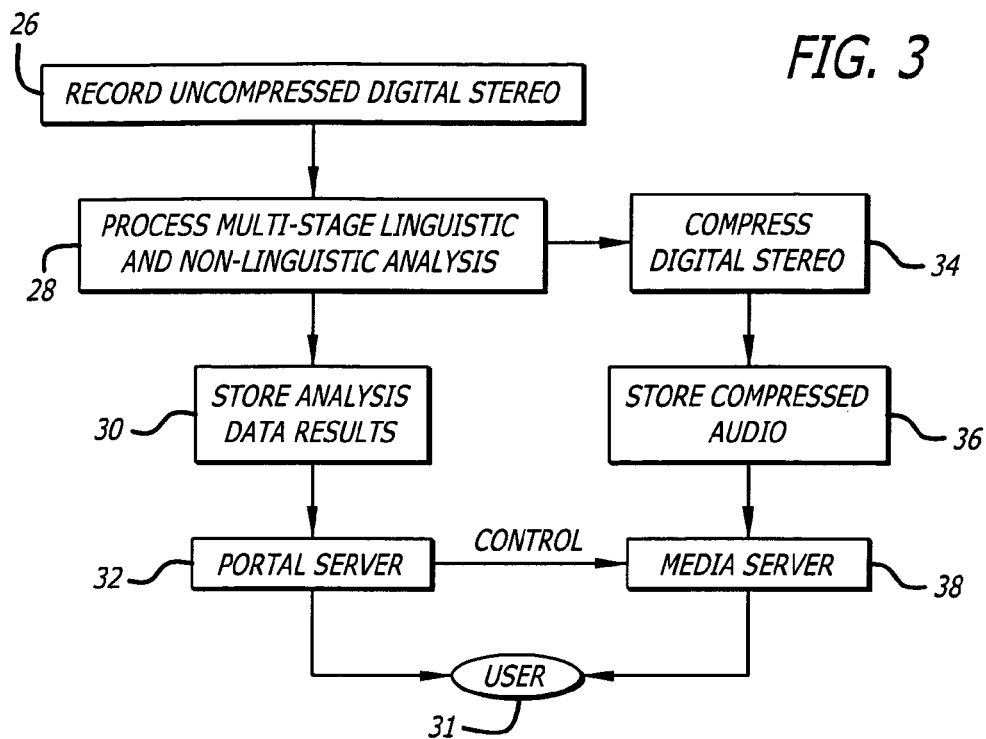
FIG. 3 is a flow chart illustrating the process of analyzing a telephonic communication in accordance with an exemplary embodiment of the present invention.

FIG. 3 illustrates an uncompressed digital stereo audio waveform of a conversation between a customer and a call center agent that is recorded and separated into customer voice data and call center agent voice data 26. The voice data associated with the audio waveform is then mined and analyzed using multi-stage linguistic and non-linguistic analytic tools 28. The analysis data is stored 30 and can be accessed by a user 31 (e.g., CSR supervisor) through an interface portal 32 for subsequent review 32. The digital stereo audio waveform is compressed 34 and stored 36 in an audio file which is held on a media server 38 for subsequent access through the interface portal 32.

The method of the present invention is configured to postpone audio compression until analysis of the audio data is complete. This delay allows the system to apply the analytic tools to a truer and clearer hi-fidelity signal. The system employed in connection with the present invention also minimizes audio distortion, increases fidelity, eliminates gain control and requires no additional filtering of the signal.

Figure 4:
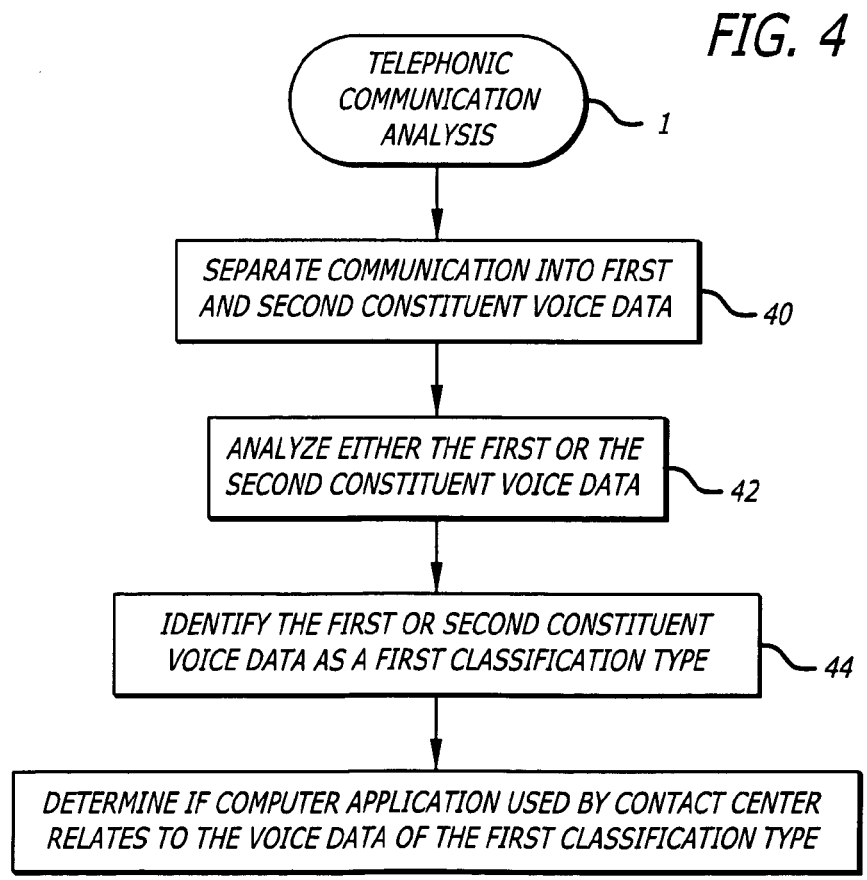
FIG. 4 is a flow chart illustrating the process of analyzing a telephonic communication in accordance with an exemplary embodiment of the present invention.

As shown in FIG. 4, the method of the present invention more specifically comprises the step of separating a telephonic communication 2 into first constituent voice data and second constituent voice data 40. One of the first or second constituent voice data may then be separately analyzed at step 42. At step 44, the first constituent voice data or the second constituent voice data may be classified by a particular classification type. It then may be determined if the computer application used by the CSR relates to the typed voice data, e.g., during a particular time point or interval.

The telephonic communication 2 being analyzed may be a single communication or one of numerous communications stored within a contact center server 12, or communicated to a contact center during a given time period. Accordingly, one embodiment of the present method contemplates that the telephonic communication 2 being subjected to analysis is selected from the plurality of telephonic communications. The selection criteria for determining which communication or communications to analyze may be based on any criteria suitable for a particular use. For example, the communications coming into a contact center can be automatically categorized into a plurality of call types using an appropriate algorithm. For example, the system may employ a word-spotting algorithm that categorizes communications 2 into particular types or categories based on words used in the communication. In one embodiment, each communication 2 is automatically categorized as a service call type (e.g., a caller requesting assistance for servicing a previously purchased product), a retention call type (e.g., a caller expressing indignation, or having a significant life change event), or a sales call type (e.g., a caller purchasing an item offered by a seller). In one scenario, it may be desirable to analyze all of the "sales call type" communications received by a contact center during a predetermined time frame.

Alternatively, the communications 2 may be grouped according to customer categories, and the user may desire to analyze the communications 2 between the call center and communicants within a particular customer category. For example, it may be desirable for a user to perform an analysis only of a "platinum customers" category, consisting of high end investors, or a "high volume distributors" category comprised of a user's best distributors.

In one embodiment the telephonic communication 2 is telephone call in which a telephonic signal is transmitted. As many be seen in FIGS. 5 and 6, a customer sending a telephonic signal may access a contact center 10 through the public switched telephone network (PSTN) 203 and an automatic call distribution system (PBX/ACD) 205 directs the communication to one of a plurality of agent work stations 211, 213. Each agent work station 211, 213 may include, for example, a computer 215 and a telephone 213.

When analyzing voice data, it is preferable to work from a true and clear hi-fidelity signal. This is true both in instances in which the voice data is being translated into a text format for analysis, or in instance in which an analysis model is being applied directly to an audio waveform, audio stream or file containing voice data.

Figure 5:
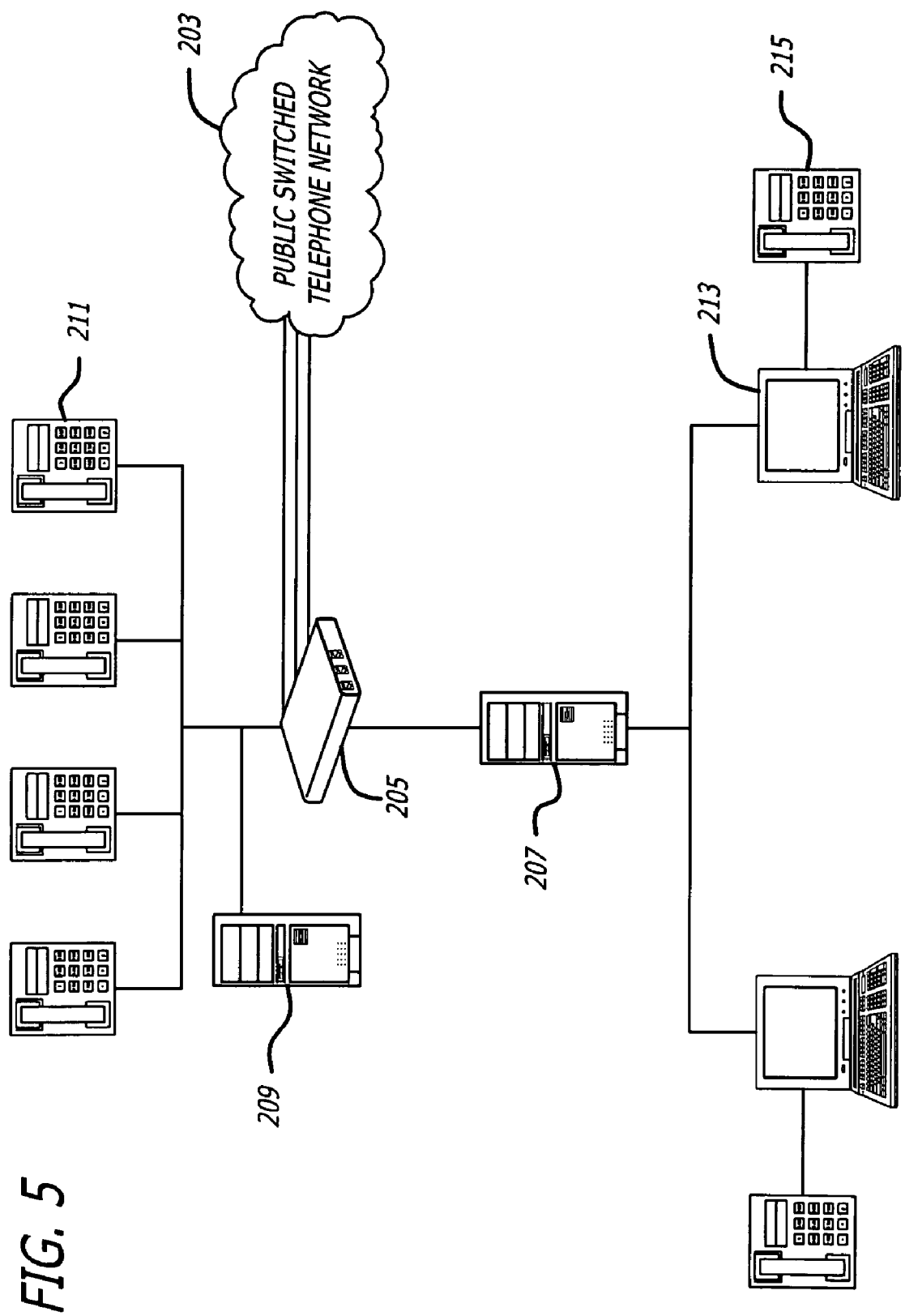
FIG. 5 is a block diagram of a telephonic communication system according to an exemplary embodiment of the present invention.

FIG. 5 illustrates a telephonic communication system 201, such as a distributed private branch exchange (PBX), having a public switched telephone network (PSTN) 203 connected to the PBX through a PBX switch 205.

The PBX switch 205 may provide an interface between the PSTN 203 and a local network. The interface may be controlled by software stored on a telephony server 207 coupled to the PBX switch 205. The PBX switch 205, using interface software, may connect trunk and line station interfaces of the public switch telephone network 203 to stations of a local network or other peripheral devices contemplated by one skilled in the art. The PBX switch may be integrated within telephony server 207. The stations may include various types of communication devices connected to the network, including the telephony server 207, a recording server 209, telephone stations 211, and client personal computers 213 equipped with telephone stations 215. The local network may further include fax machines and modems.

Generally, in terms of hardware architecture, the telephony server 207 may include a processor, memory, and one or more input and/or output (I/O) devices (or peripherals) that are communicatively coupled via a local interface. The processor may be any custom-made or commercially available processor, a central processing unit (CPU), an auxiliary processor among several processors associated with the telephony server 207, a semiconductor based microprocessor (in the form of a microchip or chip set), a macroprocessor, or generally any device for executing software instructions. The memory of the telephony server 207 may include any one or a combination of volatile memory elements (e.g., random access memory (RAM, such as DRAM, SRAM, SDRAM, etc.)) and nonvolatile memory elements (e.g., ROM, hard drive, tape, CDROM, etc.). The telephony server 207 may further include a keyboard and a mouse for control purposes, and an attached graphic monitor for observation of software operation.

The telephony server 207 may incorporate PBX control software to control the initiation and termination of connections between stations and via outside trunk connections to the PSTN 203. In addition, the software may monitor the status of all telephone stations 211 in real-time on the network and may be capable of responding to telephony events to provide traditional telephone service. This may include the control and generation of the conventional signaling tones such as dial tones, busy tones, ring back tones, as well as the connection and termination of media streams between telephones on the local network. Further, the PBX control software may use a multi-port module 223 and PCs to implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

Figure 7:
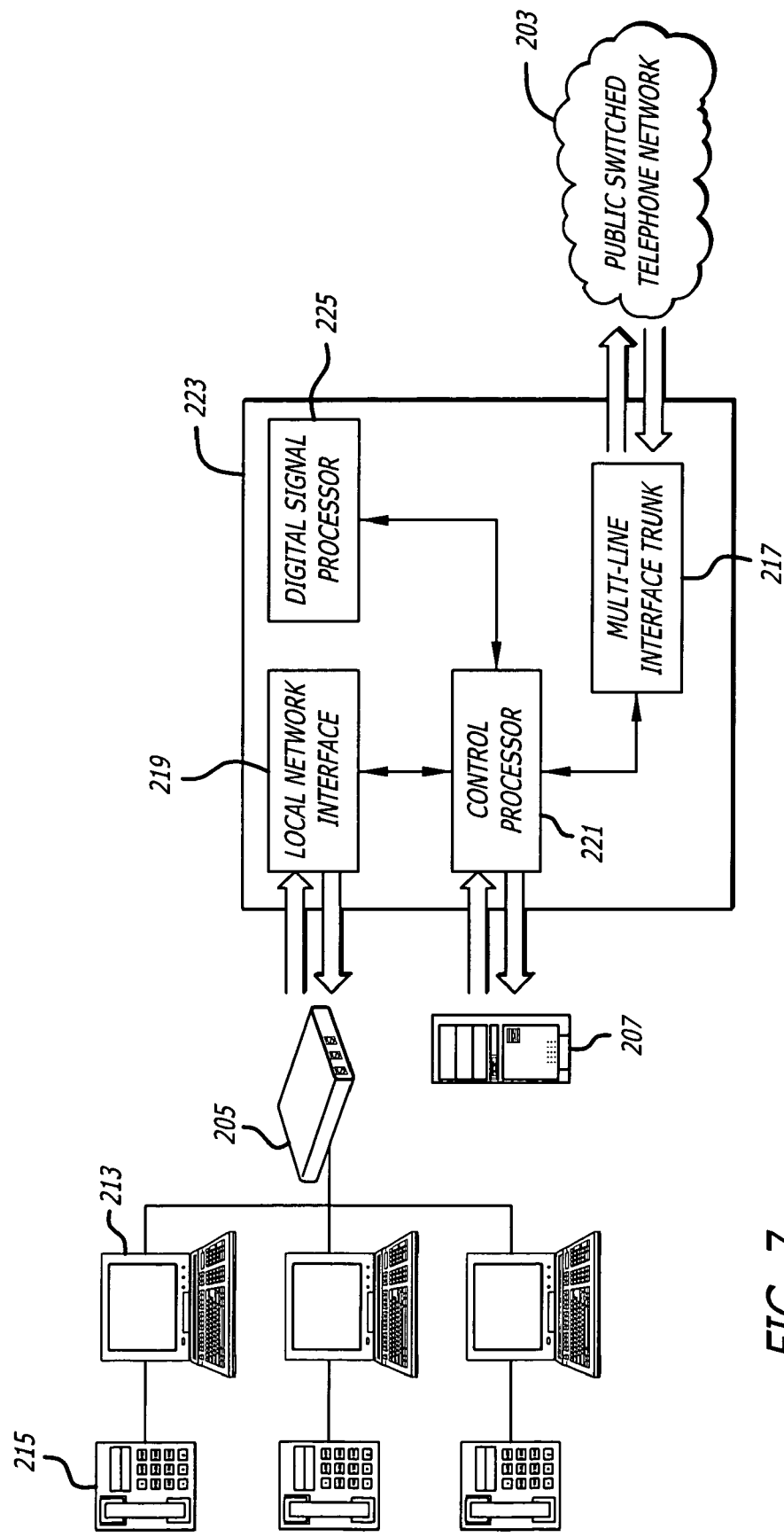
FIG. 7 is a block diagram of a telephonic communication system with a multi-port PSTN module according to an exemplary embodiment of the present invention.

Referring to FIG. 7, the telephony server 207 may be equipped with multi-port PSTN module 223 having circuitry and software to implement a trunk interface 217 and a local network interface 219. The PSTN module 223 may comprise a control processor 221 to manage the transmission and reception of network messages between the PBX switch 205 and the telephony network server 207. The control processor 221 also may be capable of directing network messages between the PBX switch 205, the local network interface 291, the telephony network server 207, and the trunk interface 217. The local network may use Transmission Control Protocol/Internet Protocol (TCP/IP). The network messages may contain computer data, telephony transmission supervision, signaling and various media streams, such as audio data and video data. The control processor 221 may direct network messages containing computer data from the PBX switch 205 to the telephony network server 207 directly through the multi-port PSTN module 223.

The control processor 221 may include buffer storage and control logic to convert media streams from one format to another, if necessary, between the trunk interface 217 and local network. The trunk interface 217 provides interconnection with the trunk circuits of the PSTN 203. The local network interface 219 provides conventional software and circuitry to enable the telephony server 207 to access the local network. The buffer RAM and control logic implement efficient transfer of media streams between the trunk interface 217, the telephony server 207, the digital signal processor 225, and the local network interface 219.

The trunk interface 217 utilizes conventional telephony trunk transmission supervision and signaling protocols required to interface with the outside trunk circuits from the PSTN 203. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The control processor 221 may manage real-time telephony event handling pertaining to the telephone trunk line interfaces, including managing the efficient use of digital signal processor resources for the detection of caller ID, DTMF, call progress and other conventional forms of signaling found on trunk lines. The control processor 221 also may manage the generation of telephony tones for dialing and other purposes, and controls the connection state, impedance matching, and echo cancellation of individual trunk line interfaces on the multi-port PSTN module 223.

Preferably, conventional PBX signaling is utilized between trunk and station, or station and station, such that data is translated into network messages that convey information relating to real-time telephony events on the network, or instructions to the network adapters of the stations to generate the appropriate signals and behavior to support normal voice communication, or instructions to connect voice media streams using standard connections and signaling protocols. Network messages are sent from the control processor 221 to the telephony server 207 to notify the PBX software in the telephony server 207 of real-time telephony events on the attached trunk lines. Network messages are received from the PBX Switch 205 to implement telephone call supervision and may control the set-up and elimination of media streams for voice transmission.

The local network interface 219 may include conventional circuitry to interface with the local network. The specific circuitry may be dependent on the signal protocol utilized in the local network. The local network may be a local area network (LAN) utilizing IP telephony. IP telephony integrates audio and video stream control with legacy telephony functions and may be supported through the H.323 protocol. H.323 is an International Telecommunication Union-Telecommunications protocol used to provide voice and video services over data networks. H.323 permits users to make point-to-point audio and video phone calls over a local area network. IP telephony systems can be integrated with the public telephone system through a local network interface 219, such as an IP/PBX-PSTN gateway, thereby allowing a user to place telephone calls from an enabled computer. For example, a call from an IP telephony client to a conventional telephone would be routed on the LAN to the IP/PBX-PSTN gateway. The IP/PBX-PSTN gateway translates H.323 protocol to conventional telephone protocol and routes the call over the conventional telephone network to its destination. Conversely, an incoming call from the PSTN 203 is routed to the IP/PBX-PSTN gateway and translates the conventional telephone protocol to H.323 protocol.

As noted above, PBX trunk control messages are transmitted from the telephony server 207 to the control processor 221 of the multi-port PSTN. In contrast, network messages containing media streams of digital representations of real-time voice are transmitted between the trunk interface 217 and local network interface 219 using the digital signal processor 225. The digital signal processor 225 may include buffer storage and control logic. Preferably, the buffer storage and control logic implement a first-in-first-out (FIFO) data buffering scheme for transmitting digital representations of voice audio between the local network to the trunk interface 217. It is noted that the digital signal processor 225 may be integrated with the control processor 221 on a single microprocessor.

The digital signal processor 225 may include a coder/decoder (CODEC) connected to the control processor 221. The CODEC may be a type TCM29c13 integrated circuit made by Texas Instruments, Inc. For example, the digital signal processor 225 may receive an analog or digital voice signal from a station within the network or from the trunk lines of the PSTN 203. The CODEC converts the analog voice signal into in a digital from, such as digital data packets. It should be noted that the CODEC is not used when connection is made to digital lines and devices. From the CODEC, the digital data is transmitted to the digital signal processor 225 where telephone functions take place. The digital data is then passed to the control processor 221 which accumulates the data bytes from the digital signal processor 225. It is preferred that the data bytes are stored in a first-in-first-out (FIFO) memory buffer until there is sufficient data for one data packet to be sent according to the particular network protocol of the local network. The specific number of bytes transmitted per data packet depends on network latency requirements as selected by one of ordinary skill in the art. Once a data packet is created, the data packet is sent to the appropriate destination on the local network through the local network interface 219. Among other information, the data packet may contain a source address, a destination address, and audio data. The source address identifies the location the audio data originated from and the destination address identifies the location the audio data is to be sent.

The system may enable bi-directional communication by implementing a return path allowing data from the local network, through the local network interface 219, to be sent to the PSTN 203 through the multi-line PSTN trunk interface 217. Data streams from the local network are received by the local network interface 219 and translated from the protocol utilized on the local network to the protocol utilized on the PSTN 203. The conversion of data may be performed as the inverse operation of the conversion described above relating to the IP/PBX-PSTN gateway. The data stream may be restored in appropriate form suitable for transmission through to either a connected telephone 211, 215 or an interface trunk 217 of the PSTN module 223, or a digital interface such as a T1 line or ISDN. In addition, digital data may be converted to analog data for transmission over the PSTN 203.

Generally, the PBX switch of the present invention may be implemented with hardware or virtually. A hardware PBX has equipment located local to the user of the PBX system. The PBX switch 205 utilized may be a standard PBX manufactured by Avaya, Siemens AG, NEC, Nortel, Toshiba, Fujitsu, Vodavi, Mitel, Ericsson, Panasonic, or InterTel. In contrast, a virtual PBX has equipment located at a central telephone service provider and delivers the PBX as a service over the PSTN 203.

Turning again to FIG. 1, the system may include a recording server 209 for recording and separating network messages transmitted within the system. The recording server 209 may be connected to a port on the local network, as seen in FIG. 1. Alternatively, the recording server 209 may be connected to the PSTN trunk line. The recording server 209 may include control system software, such as recording software. The recording software of the invention may be implemented in software (e.g., firmware), hardware, or a combination thereof. The recording software may be implemented in software as an executable program, and is executed by one or more special or general purpose digital computer(s), such as a personal computer (PC; IBM-compatible, Apple-compatible, or otherwise), server, personal digital assistant, workstation, minicomputer, or mainframe computer. An example of a general purpose computer that can implement the recording software of the present invention is shown in FIG. 2. The recording software may reside in, or have portions residing in, any computer such as, but not limited to, a general purpose personal computer. Therefore, recording server 209 of FIG. 2 may be representative of any type of computer in which the recording software resides or partially resides.

Generally, hardware architecture may be the same as that discussed above and shown in FIG. 2. Specifically, the recording server 209 includes a processor, memory, and one or more input and/or output (I/O) devices (or peripherals) that are communicatively coupled via a local interface as previously described. The local interface can be, for example, but not limited to, one or more buses or other wired or wireless connections. The local interface may have additional elements, which are omitted for simplicity, such as controllers, buffers (caches), drivers, repeaters, and receivers, to enable communications. Further, the local interface may include address, control, and/or data connections to enable appropriate communications among the other computer components.

As noted above, the recording server 209 incorporates recording software for recording and separating a signal based on the source address and/or destination address of the signal. The method utilized by the recording server 209 depends on the communication protocol utilized on the communication lines to which the recording server 209 is coupled. In the communication system contemplated by the present invention, the signal carrying audio data of a communication between at least two users may be an analog signal or a digital signal in the form of a network message. In one embodiment, the signal is an audio data transmitted according to a signaling protocol, for example the H.323 protocol described above.

Figure 8:
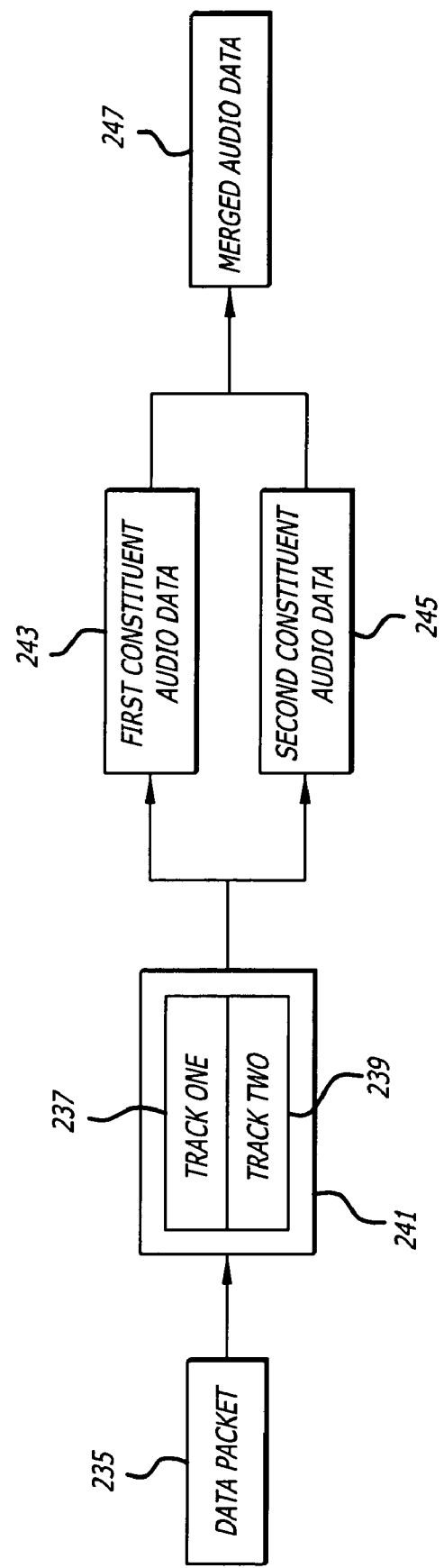
FIG. 8 is a flow chart illustrating the process of recording and separating a telephonic communication in accordance with an exemplary embodiment of the present invention.
Figure 9:
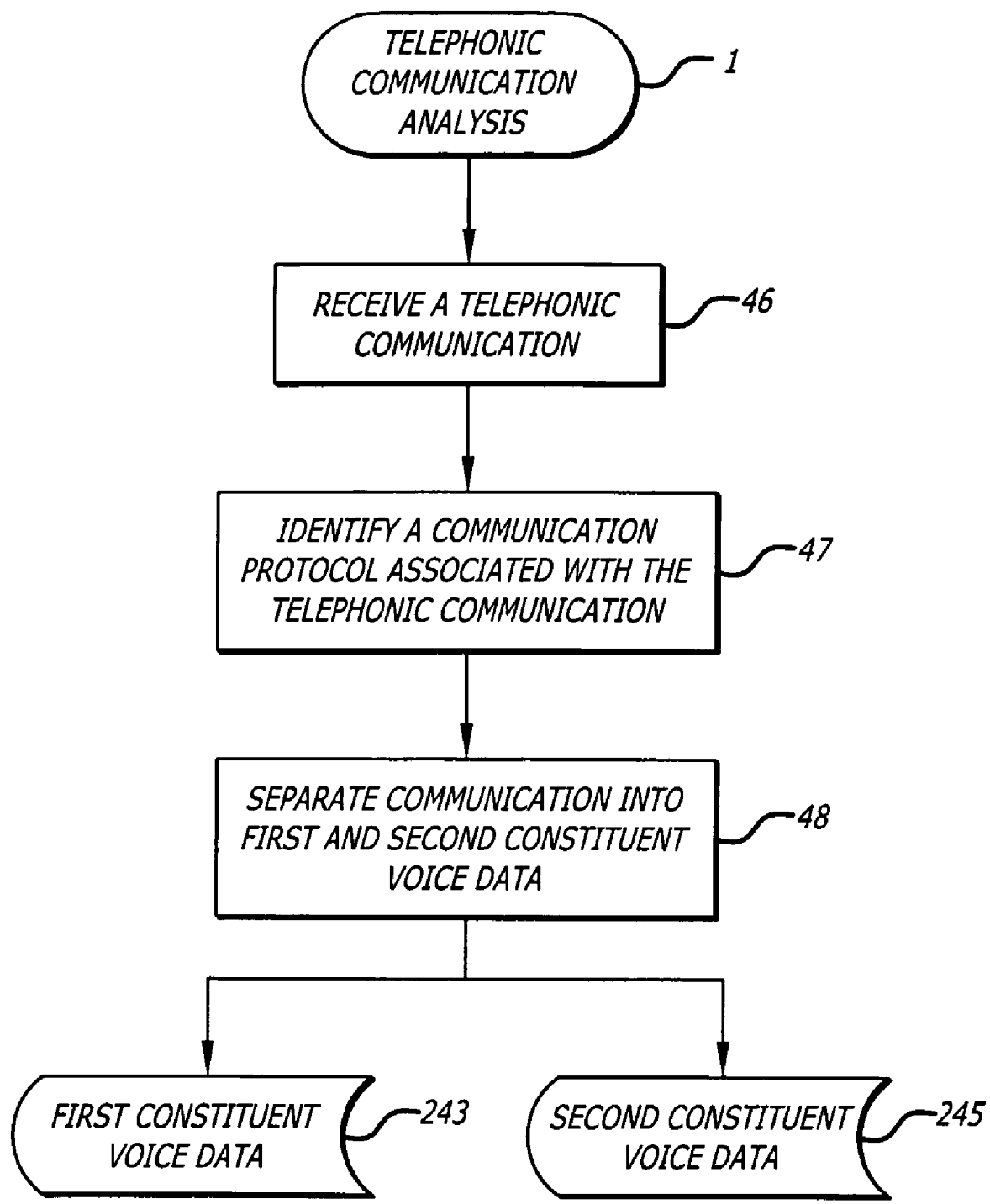
FIG. 9 is a flow chart illustrating the process of recording and separating a telephonic communication in accordance with an exemplary embodiment of the present invention.

An example of a communication between an outside caller and a call center agent utilizing the present system 200 is illustrated in FIG. 8 and described herein. In the embodiment of FIG. 8, when an outside caller reaches the system through the multi-line interface trunk 217, their voice signal may be digitized (if needed) in the manner described above, and converted into digital data packets 235 according to the communication protocol utilized on the local network of the system. The data packet 235 may comprise a source address identifying the address of the outside caller, a destination address identifying the address of the call center agent, and first constituent audio data comprising at least a portion of the outside callers voice. The data packet 235 may further comprise routing data identifying how the data packet 235 should be routed through the system and other relevant data. Once the data packet 235 is created, the data packet 235 may be sent to the appropriate destination on the local network, such as to a call center agent, through the local network interface 219. The PBX and/or an automatic call distributor (ACD) may determine the initial communication setup, such as the connection state, impedance matching, and echo cancellation, according to predetermined criteria.

Similar to the process described above, when the call center agent speaks, their voice is digitized (if needed) and converted into digital data packet 235 according to the communication protocol utilized on the local network. The data packet 235 comprises a source address identifying the address of the call center agent, a destination address identifying the address of the outside caller, and second constituent audio data comprising at least a portion of the call center agent's voice. The data packet 235 is received by the local network interface 219 and translated from the communication protocol utilized on the local network to the communication protocol utilized on the PSTN 203. The conversion of data can be performed as described above. The data packet 235 is restored in appropriate form suitable for transmission through to either a connected telephone 211, 215 or a interface trunk 217 of the PSTN module 223, or a digital interface such as a T1 line or ISDN. In addition, digital data may be converted to analog data for transmission through the PSTN 203.

The recording server 209 may receive a data packet 235 comprising: the source address identifying the address of the outside caller, a destination address identifying the address of the call center agent, and the first constituent audio data comprising at least a portion of the outside callers voice. The recording server 209 may alternatively receive a data packet 235 comprising a source address identifying the address of the call center agent, a destination address identifying the address of the outside caller, and second constituent audio data comprising at least a portion of the customer's agent voice. It is understood by one of ordinary skill in the art that the recording server 209 is programmed to identify the communication protocol utilized by the local network and extract the audio data within the data packet 235. In one embodiment, the recording server 209 can automatically identify the utilized communication protocol from a plurality of communication protocols. The plurality of communication protocols can be stored in local memory or accessed from a remote database.

The recording server 209 may comprise recording software to record the communication session between the outside caller and the call center agent in a single data file in a stereo format. The first data file 241 has at least a first audio track 237 and a second audio track 237. Once a telephone connection is established between an outside caller and a call center agent, the recording software may create a first data file 241 to record the communication between the outside caller and the call center agent. It is contemplated that the entire communication session or a portion of the communication session can be recorded.

Upon receiving the data packet 235, the recording server 209 determines whether to record the audio data contained in the data packet 235 in either the first audio track 237 or the second audio track 239 of the first data file 241 as determined by the source address, destination address, and/or the audio data contained within the received data packet 235. Alternatively, two first data files can be created, wherein the first audio track is recorded to the one of the first data file and the second audio track is recorded to the second first data file. In one embodiment, if the data packet 235 comprises a source address identifying the address of the outside caller, a destination address identifying the address of the call center agent, and first constituent audio data, the first constituent audio data is recorded on the first audio track 237 of the first data file 241. Similarly, if the data packet 235 comprises a source address identifying the address of the call center agent, a destination address identifying the address of the outside caller, and second constituent audio data, the second constituent audio data is recorded on the second audio track 239 of the first data file 241. It should be noted the first and second constituent audio data can be a digital or analog audio waveform or a textual translation of the digital or analog waveform. The recording process may be repeated until the communication link between the outside caller and call center agent is terminated.

Figure 6:
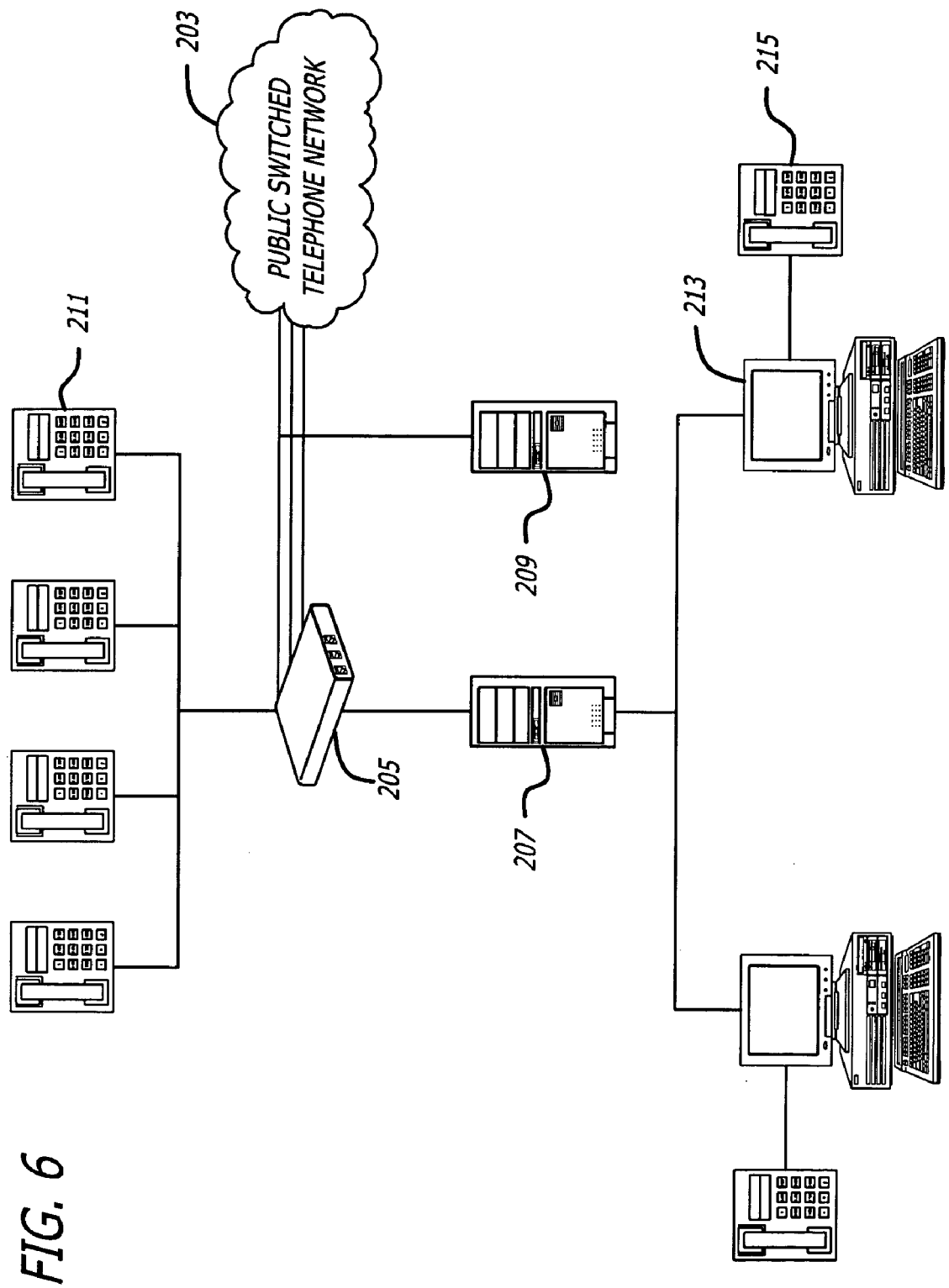
FIG. 6 is a block diagram of a telephonic communication system according to an exemplary embodiment of the present invention.

As noted above, the recording server 209 may be connected to the trunk lines of the PSTN 203 as seen in FIG. 6. The PSTN 203 may utilize a different protocol and therefore, the recording server 209 is configured to identify the communication protocol utilized by the PSTN 203, recognize the source and destination address of a signal and extract the audio data from the PSTN 203.

As shown in FIG. 8, once the communication link is terminated, the recording server 209 ends the recording session and stores the single data file having the recorded communication session in memory. After the first data file is stored in memory, the recording server 209 may extract either or both of the first constituent audio data from the first audio track of the first data file or the second constituent audio data from the second audio track of the first data file. In one embodiment, the first constituent audio data extracted from the first audio track is stored in a first constituent data file 243. Similarly, the second constituent audio data extracted from the second audio track may be stored in a second constituent data file 245. The first and second constituent data files 243, 245 can be compressed before being stored in memory. The extracted data can be in the form of a digital or analog audio waveform or can be a textual translation of the first or second constituent audio data. It is contemplated that either or both of the first constituent data file 243 or the second constituent data file 245 can be further analyzed or processed. For example, among other processes and analyses, filtering techniques can be applied to the first constituent data file and/or the second constituent data file. Moreover, event data, such as silence periods or over-talking, may be identified through analysis techniques known to those skilled in the art.

Further, as illustrated in FIG. 8, the first constituent data file 243 and second constituent data file 245 may be merged together into a single second data file 247. The first and second constituent data files may be merged in a stereo format where the first constituent audio data from the first constituent data file 243 is stored on a first audio track of the second data file 247 and the second constituent audio data from the second constituent data file 245 is stored on a second audio track of the second data file 247. Alternatively, the first and second constituent data files may be merged in a mono format where the first constituent audio data from the first constituent data file 243 and the second constituent audio data from the second constituent data file 245 are stored on a first audio track of the second data file 247. Additionally, the first and second constituent audio data may be merged into a document having a textual translation of the audio data. In such a case, identifiers may be associated with each of the merged first and second constituent audio data in order to associate the merged first constituent audio data with the outside caller, and associate the merged second constituent audio data with the call center agent. The second data file 247 may be compressed before being stored in memory.

It is known in the art that "cradle-to-grave" recording may be used to record all information related to a particular telephone call from the time the call enters the contact center to the later of: the caller hanging up or the agent completing the transaction. All of the interactions during the call are recorded, including interaction with an IVR system, time spent on hold, data keyed through the caller's key pad, conversations with the agent, and screens displayed by the agent at his/her station during the transaction.

Figure 10:
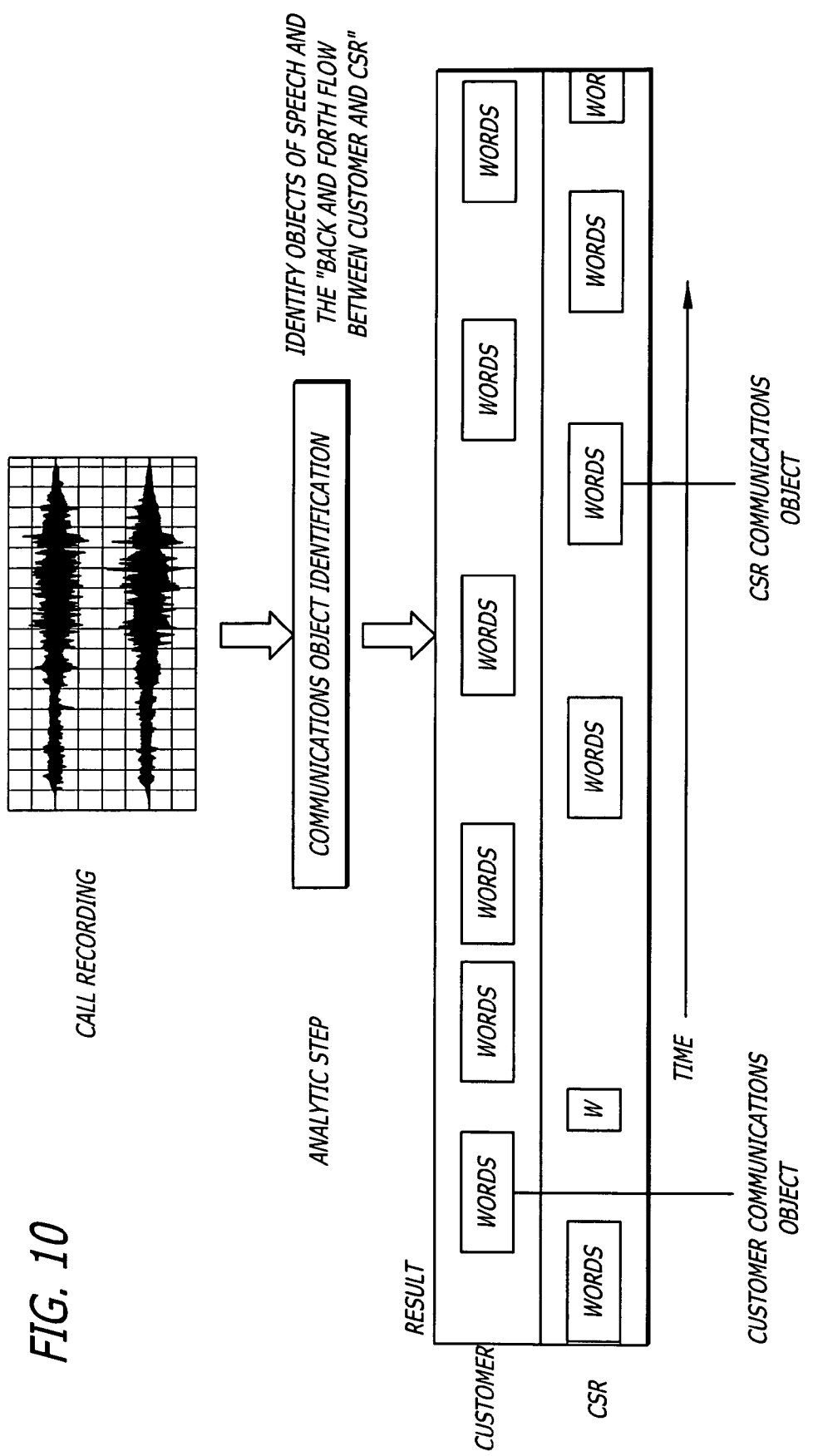
FIG. 10 is a block diagram illustrating customer and CSR communications component identification according to an exemplary embodiment of the present invention.
Figure 11:
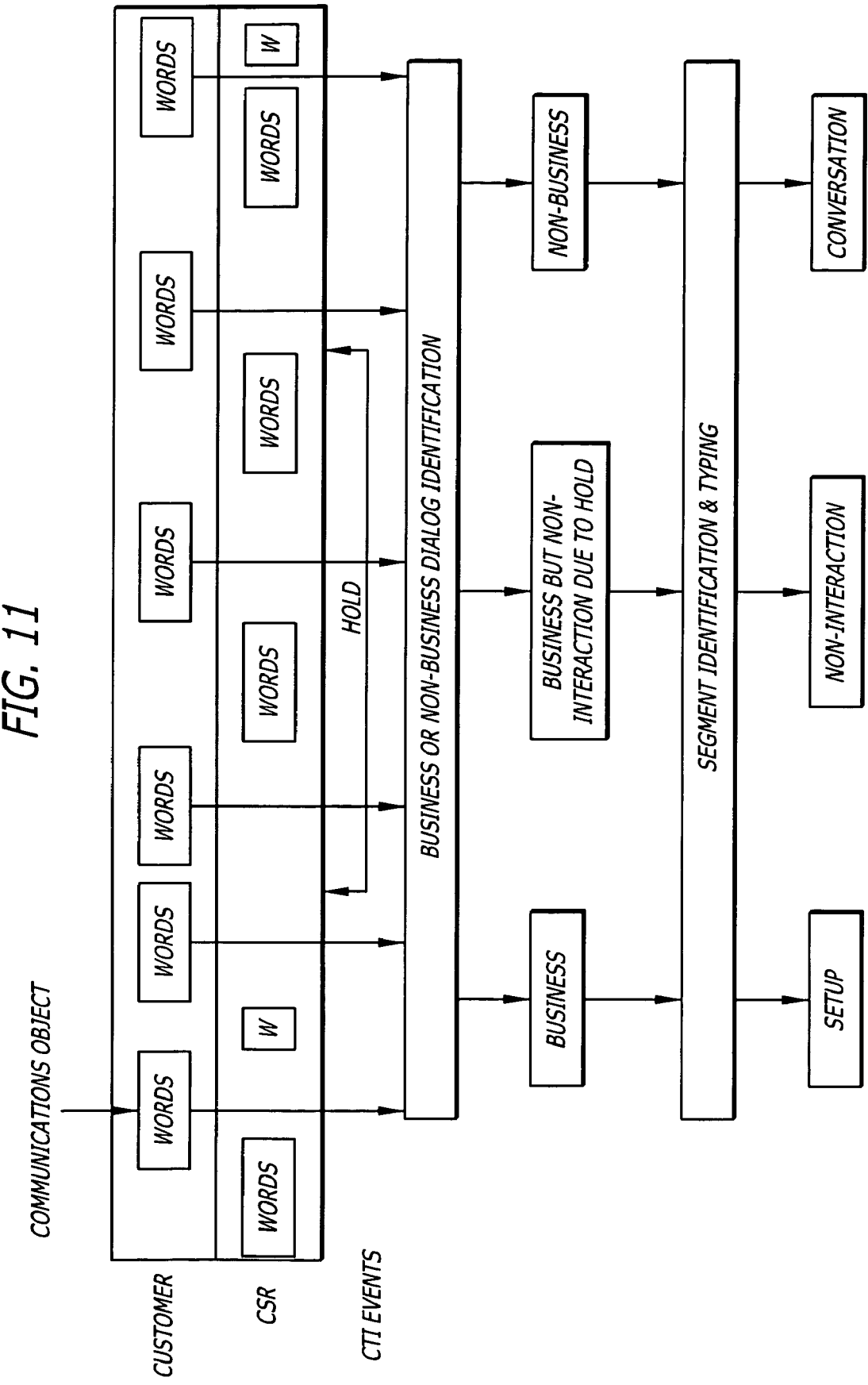
FIG. 11 is block diagram illustrating communications component identification from a VoIP (Voice Over Internet Protocol) mono recording using speaker segmentation analytics to achieve a stereo recording according to an exemplary embodiment of the present invention.

As shown in FIGS. 10-11, once the first and second constituent voice data are separated one from the other, each of the first and second constituent voice data can be independently mined and analyzed. It will be understood that "mining" as referenced herein is to be considered part of the process of analyzing the constituent voice data.

Even with conventional audio mining technology, application of analysis models directly to an audio file can be very difficult. In particular, disparities in dialect, phonemes, accents and inflections can impede or render burdensome accurate identification of words. And while it is contemplated by the present invention that mining and analysis in accordance with the present invention can be applied directly to voice data configured in audio format, in a preferred embodiment of the present invention, the voice data to be mined and analyzed is first translated into a text file. It will be understood by those of skill that the translation of audio to text and subsequent data mining may be accomplished by systems known in the art. For example, the method of the present invention may employ software such as that sold under the brand name Audio Mining SDK by Scansoft, Inc., or any other audio mining software suitable for such applications. As shown in FIGS. 10-11, the separated voice data is used to form communication objects which may be typed (i.e., classified) into categories such as setup, information exchange, miscommunication, non-interaction, conversation, or positive comment. In particular, the method of the present invention searches for and identifies text-based keywords relevant to each of the predefined type categories. The typed communication objects may then be further categorized to form segments of objects according to type.

Accordingly, a computer readable medium for controlling a computer comprises a plurality of code segments for controlling a computer. A code segment receives a telephonic communication comprised of voice data and event data. A code segment receives computer application data comprising data associated with at least one computer application in use during the telephonic communication. A code segment analyzes the telephonic communication by translating the received voice data into a text format, the text format defining a plurality of components. At least one component of the text data and communication event data occurring during a time interval is classified into one of a plurality of object types, and the computer application data during the time interval is compared to the object type of the classified components FIG. 10 illustrates a stereo call recording with voice data for a customer and a CSR. The voice data from the stereo recording is converted to text. Accordingly, there is separate text data for the customer communication and the CSR communication. Objects may be identified and typed (i.e., classified) within the text. Alternatively, a mono (rather than stereo) call recording that may be from a VoIP (Voice Over Internet Protocol) may be used to form the stereo recording of the customer and the CSR using speaker segmentation analytics. Upon formation of the stereo recording, the communications objects of the customer and the CSR may be identified and typed (i.e., classified).

FIG. 11 illustrates the voice data of the CSR and customer as well as CTI (Computer Telephony Integration) events (e.g., a "hold" event) as components or objects of a telephonic communication. The telephonic communication objects may be typed (i.e., classified) as business related communications objects or as non-business (e.g., conversation) related objects. Objects may be further classified as non-interaction objects that are business related. For example, the CSR may place the customer on hold in order to speak with another CSR regarding the customer's situation.

Upon classification of the customer and CSR communication objects, segments of like objects may be formed. For example, communications objects may be combined to form segments related to call setup, information exchange, non-interaction, conversation, or positive comment.

According to an exemplary embodiment of the present invention, the classified objects (e.g., the business related objects or information exchange objects) may be verified (e.g., determine if the classification is correct) by examining the computer applications used by a CSR during the time of the segment. For example, if a business-related computer application is present on the CSR's desktop display during a business-type segment, it may be determined that the segment is correctly typed as business related or information exchange.

According to another embodiment of the invention, a plurality of telephonic communication can be classified. Accordingly, a computer readable medium for controlling a computer comprises a plurality of code segments for controlling a computer. A plurality of telephonic communications is received where the telephonic communication include either or both voice data and event data. Computer application data comprising data associated with at least one computer application in use during each of the telephonic communications is also received. At this point, two or more of the plurality of telephonic communications can be analyzed.

During the analysis, the received voice data associated with each of the telephonic communications is translated into a text format defining a plurality of components. Each of the telephonic communications is classified into one of a plurality of call set types as discussed herein. According to one embodiment, at least one component of the text data and communication event data occurring during the time interval are also classified into one of a plurality of object types. The computer application data during the time interval are compared to either or both of the object type and the call set type of the classified telephonic communications. It should be noted that the present invention may perform either or both of the classification of the communications into call set types and the classification of call segments into object types.

Figure 12:
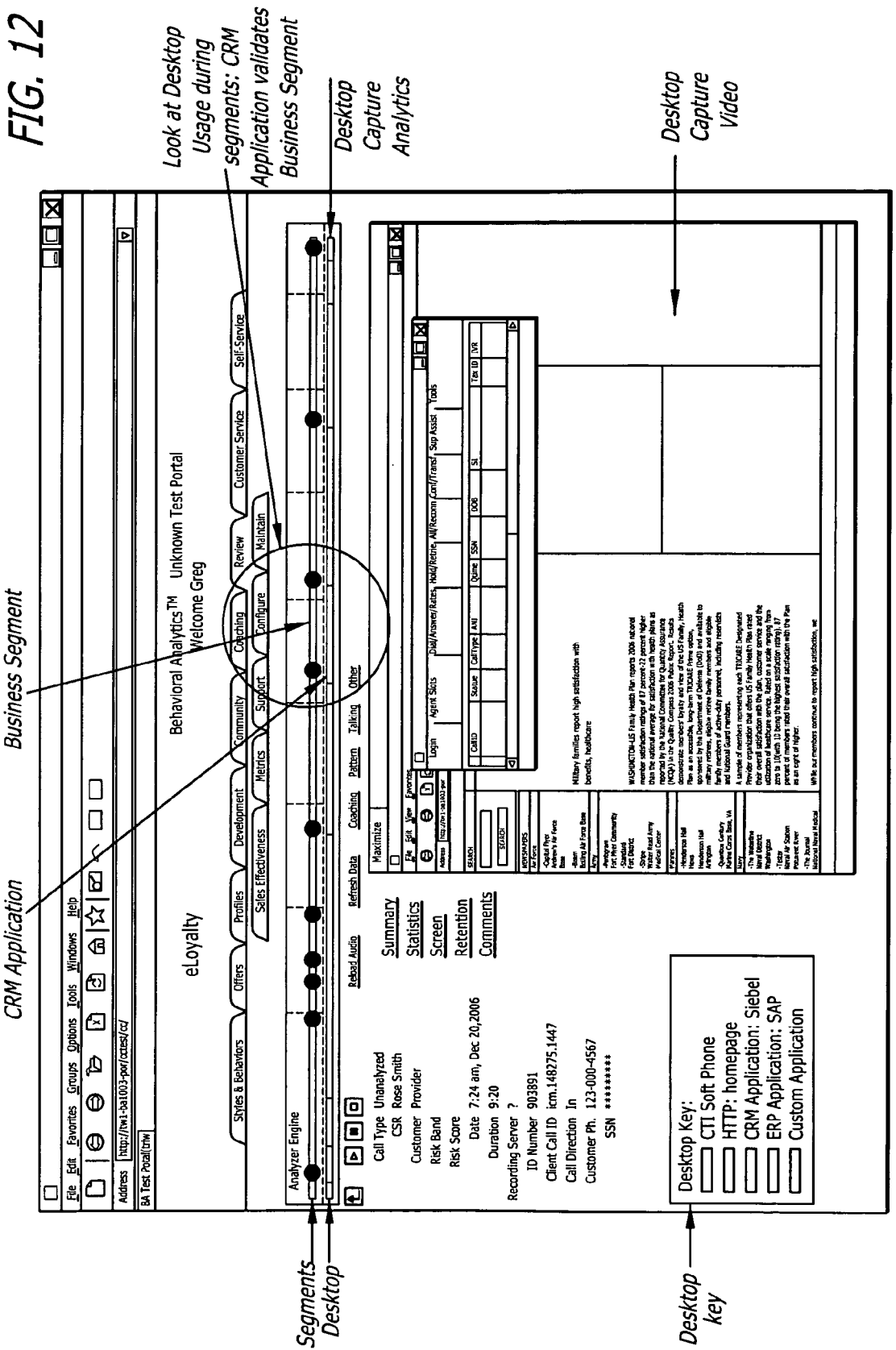
FIG. 12 an exemplary display illustrating computer applications used during particular segments of a communications session between a customer and a CSR according to an exemplary embodiment of the present invention.

FIG. 12 illustrates an exemplary display (e.g., a GUI (graphical user interface)) indicating the call segments and the desktop applications in use by the CSR during the call segments. Applications may include, for example, CTI soft phone, HTTP homepage, CRM applications (e.g., Siebel), ERP applications (e.g., SAP), a custom application, or any other application. Also depicted is a video segment of the application is use by the CSR during a particular segment of the telephonic communication. This video segment may be video captured from the CSR's computer display (i.e. desktop) during the interaction with the customer.

Thus, upon review by an administrator or by the system, the communications segment typed as business related may be verified by the application in use by the CSR. For example, business-related segments of a telephonic communication may be identified at particular portions of a linear representation of the communication. Similarly, applications used by the CSR may be indicated below the linear communication segment representation to indicate the desktop application used by the CSR during time intervals of the communication.

A user of the system described above (e.g., in connection with FIGS. 1-2 and 5-7, etc.) may interact with the system via the exemplary graphical user interface shown in FIG. 12. The GUI may enable the user to navigate through the system to obtain desired reports and information regarding the caller interaction events stored in memory. The GUI can be part of a software program residing in whole or in part in the a computer 12, or it may reside in whole or in part on a server coupled to a computer 12 via a network connection, such as through the Internet or a local or wide area network (LAN or WAN). Moreover, a wireless connection can be used to link to the network.

The system may be accessed via an Internet connection from a computer. For example, browser technology on the computer can be implemented to reach a server hosting the system program. The GUI for the system may appear as Internet web pages on the display of the computer.

According to an embodiment of the present invention, a psychological behavioral model may also be used to analyze the voice data, and may be, for example, the Process Communication Model ("PCM") developed by Dr. Taibi Kahler. PCM is a psychological behavioral analytic tool which presupposes that all people fall primarily into one of six basic personality types: Reactor, Workaholic, Persister, Dreamer, Rebel and Promoter. Although each person is one of these six types, all people have parts of all six types within them arranged like a six-tier configuration. Each of the six types learns differently, is motivated differently, communicates differently, and has a different sequence of negative behaviors they engage in when they are in distress. Importantly, according to PCM, each personality type of PCM responds positively or negatively to communications that include tones or messages commonly associated with another of the PCM personality types. Thus, an understanding of a communicant's PCM personality type offers guidance as to an appropriate responsive tone or message or wording.

According to the PCM Model the following behavioral characteristics are associated with the respective personality types. Reactors: compassionate, sensitive, and warm; great "people skills" and enjoy working with groups of people. Workaholics: responsible, logical, and organized. Persisters: conscientious, dedicated, and observant; tend to follow the rules and expect others to follow them. Dreamers: reflective, imaginative, and calm. Rebels: creative, spontaneous, and playful. Promoters: resourceful, adaptable, and charming.

These behavioral characteristics may be categorized by words, tones, gestures, postures and facial expressions, can be observed objectively with significantly high interjudge reliability.

Significant words may be mined within one or both of the separated first and second constituent voice data, and applies PCM to the identified words. For example, the following behavioral signifiers (i.e., words) may be associated with the corresponding behavioral type in the PCM Model TYPE BEHAVIORAL SIGNIFIERS: Reactors—Emotional Words; Workaholics—Thought Words; Persisters—Opinion Words; Dreamers—Reflection Words; Rebels—Reaction Words; Promoters—Action Words.

When a behavioral signifier is identified within the voice data, the identified behavioral signifier is executed against a system database which maintains all of the data related to the psychological behavioral model. Based on the behavioral signifiers identified in the analyzed voice data, a predetermined algorithm is used to decipher a linguistic pattern that corresponds to one or more of the PCM personality types. More specifically, the method mines for linguistic indicators (words and phrases) that reveal the underlying personality characteristics of the speaker during periods of distress. Non-linguistic indicators may also be identified to augment or confirm the selection of a style for each segment of speech. Looking at all the speech segments in conjunction with personality information the software determines an order of personality components for the caller by weighing a number of factors such as timing, position, quantity and interaction between the parties in the dialog.

The resultant behavioral assessment data is stored in a database so that it may subsequently be used to comparatively analyze against behavioral assessment data derived from analysis of the other of the first and second constituent voice data. The software considers the speech segment patterns of all parties in the dialog as a whole to refine the behavioral and distress assessment data of each party, making sure that the final distress and behavioral results are consistent with patterns that occur in human interaction. Alternatively, the raw behavioral assessment data derived from the analysis of the single voice data may be used to evaluate qualities of a single communicant (e.g., the customer or agent behavioral type, etc.). The results generated by analyzing voice data through application of a psychological behavioral model to one or both of the first and second constituent voice data can be graphically illustrated as discussed in further detail below.

It should be noted that, although one preferred embodiment of the present invention uses PCM as a linguistic-based psychological behavioral model, it is contemplated that any known linguistic-based psychological behavioral model be employed without departing from the present invention. It is also contemplated that more than one linguistic-based psychological behavioral model be used to analyze one or both of the first and second constituent voice data.

In addition to the behavioral assessment of voice data, the method of the present invention may also employ distress analysis to voice data. Linguistic-based distress analysis is preferably conducted on both the textual translation of the voice data and the audio file containing voice data. Accordingly, linguistic-based analytic tools as well as non-linguistic analytic tools may be applied to the audio file. For example, one of skill in the art may apply spectral analysis to the audio file voice data while applying a word spotting analytical tool to the text file. Linguistic-based word spotting analysis and algorithms for identifying distress can be applied to the textual translation of the communication. Preferably, the resultant distress data is stored in a database for subsequent analysis of the communication.

While the specific embodiments have been illustrated and described, numerous modifications come to mind without significantly departing from the spirit of the invention and the scope of protection is only limited by the scope of the accompanying Claims.

What is claimed is:

1. A non-transitory tangible computer readable medium for controlling a computer and comprising a plurality of code segments for classifying a telephonic communication, the computer readable medium comprising:
   a code segment for receiving the telephonic communication, wherein the telephonic communication comprises at least one of voice data and event data;
   a code segment for receiving computer application data comprising data associated with at least one computer application in use during the telephonic communication; and,
   a code segment for analyzing the telephonic communication, the code segment comprising:
      a code segment for translating the voice data into a text format, the text format defining a plurality of components;
      a code segment for classifying at least one of the event data and at least one of the plurality of components occurring during a time interval of the telephonic communication into one of a plurality of object types; and
      a code segment for comparing the computer application data associated with the time interval to the one of the plurality of object types.

2. The computer readable medium of claim 1, wherein the telephonic communication is received from a database of stored telephonic communications.

3. The computer readable medium of claim 1, wherein the object type comprises at least one of a call setup object type, an information exchange object type, a miscommunication object type, a non-interaction object type, a conversation object type, a positive comment object type, a business related object type, a non-business related object type, an interaction object type and a non-interactive object type.

4. The computer readable medium of claim 1, wherein the event data is defined by a CTI event, the CTI event comprising at least one of a hold time event, a call transfer event, and a data entry event.

5. The computer readable medium of claim 1, further comprising a code segment for separating the telephonic communication into at least first constituent voice data and second constituent voice data prior to analyzing the telephonic communication.

6. The computer readable medium of claim 1, further comprising a code segment for generating a graphical user interface for displaying the classified at least one component and the computer application data for the time interval, the graphical user interface comprising:
   a code segment for receiving an input prompt to retrieve at least one of the classified at least one component and the computer application data associated with the time interval;
   a code segment for receiving the input transmission of the prompted at least one of the classified at least one component and the computer application data associated with the time interval; and,
   a code segment for displaying the received at least one of the classified at least one component and the computer application data associated with the time interval.

7. The computer readable medium of claim 1, further comprising:
   a code segment for classifying the telephonic communication occurring during a time period into at least one of a plurality of predetermined call types;
   a code segment for comparing computer application data associated with the time period to the at least one of the plurality of predetermined call types;
   a code segment for generating output data indicative of a correlation of the computer application data associated with the time period to the at least one of the plurality of predetermined call types, the output data indicating one of either a correct correlation and an incorrect correlation; and
   a code segment for transmitting the generated output data.

8. The computer readable medium of claim 7, further comprising a code segment for storing the generated output data.

9. A non-transitory tangible computer readable medium for controlling a computer and comprising a plurality of code segments for classifying a plurality of telephonic communications, the computer readable medium comprising:
- a code segment for receiving the plurality of telephonic communications, wherein each telephonic communication comprises at least one of voice data and event data;
- a code segment for receiving computer application data comprising data associated with at least one computer application in use during each of the telephonic communications; and,
- a code segment for analyzing at least two of the plurality of telephonic communications, the code segment comprising:
  - a code segment for translating the voice data associated with each of the at least two of the plurality of telephonic communications into a text format, the text format defining a plurality of components;
  - a code segment for classifying each of the at least two of the plurality of telephonic communications into one of a plurality of call set types;
  - a code segment for classifying at least one of the event data and at least one of the plurality of components occurring during a time interval into one of a plurality of object types; and
  - a code segment for comparing the computer application data associated with the time interval to at least one of the object type and the call set type.

10. The computer program of claim 9, wherein the event data is defined by a CTI event, the CTI event comprising at least one of a hold time event, a call transfer event, and a data entry event.

11. The computer program of claim 9, further comprising a code segment for separating each of the plurality of telephonic communications into at least first constituent voice data and second constituent voice data prior to analyzing the plurality of telephonic communications.

12. The computer readable medium of claim 9, further comprising a code segment for generating a graphical user interface for displaying the at least one of the plurality of components and the computer application data for the time interval, the graphical user interface comprising:
- a code segment for receiving an input prompt to retrieve at least one of the classified at least one component and the computer application data associated with the time interval;
- a code segment for receiving the input transmission of the prompted at least one of the classified at least one and the computer application data associated with the time interval; and,
- a code segment for displaying the received at least one of the classified at least one component and the computer application data associated with the time interval.

13. The computer readable medium of claim 9, further comprising:
- a code segment for generating output data indicative of a correlation of the computer application data to the call set type, the output data indicating one of either a correct correlation and an incorrect correlation; and
- a code segment for transmitting the generated output data.

14. The computer readable medium of claim 13, further comprising a code segment for storing the generated output data.

15. A system for verifying the classification of a telephonic communication received by a contact center, the system comprising:
- a first server in communication with at least one database adapted to store recorded telephonic communications and computer application data, the first server comprising:
  - a module for receiving one of the telephonic communications, wherein the telephonic communication comprises at least one of voice data and event data;
  - a module for receiving computer application data comprising data associated with at least one computer application in use during the telephonic communication; and,
  - a module for analyzing the telephonic communication, the module comprising:
    - a module for translating the voice data into a text format, the text format defining a plurality of components;
    - a module for classifying at least one of the event data and at least one of the plurality of components occurring during a time interval of the telephonic communication into one of a plurality of object types; and
    - a module for comparing the computer application data associated with the time interval to the one of the plurality of object types.

* * * * *